(12) United States Patent
Syfrig

(10) Patent No.: US 11,741,434 B2
(45) Date of Patent: Aug. 29, 2023

(54) SYSTEMS AND METHODS FOR VISUALIZING CATEGORIZED SETS OF CALENDAR EVENTS

(71) Applicant: Google LLC, Mountain View, CA (US)

(72) Inventor: Spencer Syfrig, Kanton Zürich (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/326,964

(22) Filed: May 21, 2021

(65) Prior Publication Data

US 2022/0374843 A1    Nov. 24, 2022

(51) Int. Cl.
  *G06F 16/28*      (2019.01)
  *G06Q 10/1093*   (2023.01)
  *G06F 16/22*      (2019.01)
  *G06F 3/0482*    (2013.01)

(52) U.S. Cl.
  CPC ....... *G06Q 10/1093* (2013.01); *G06F 3/0482* (2013.01); *G06F 16/22* (2019.01); *G06F 16/287* (2019.01); *G06F 2203/04803* (2013.01)

(58) Field of Classification Search
  CPC ... G06Q 10/1093; G06F 16/22; G06F 16/287; G06F 3/0482; G06F 2203/04803
  See application file for complete search history.

(56) References Cited

U.S. PATENT DOCUMENTS

| | | | | |
|---|---|---|---|---|
| 7,992,096 | B1* | 8/2011 | Davis ............... | H04M 1/72403 715/810 |
| 2002/0161756 | A1* | 10/2002 | Fesq ..................... | G06F 16/29 |
| 2003/0169301 | A1* | 9/2003 | McCauley .......... | G06F 3/04842 715/810 |
| 2013/0047072 | A1* | 2/2013 | Bailor .................. | G06F 40/197 715/234 |

* cited by examiner

*Primary Examiner* — Haoshian Shih
(74) *Attorney, Agent, or Firm* — Lowenstein Sandler LLP

(57) ABSTRACT

A method includes presenting, in a user interface of an electronic calendar application, a plurality of calendar events and a plurality of calendar event categories, wherein each calendar event of the plurality of calendar events is associated with one or more of the plurality of categories; receiving, via the user interface of the electronic calendar application, a user selection of a first calendar event category of the plurality of calendar event categories; identifying among the plurality of calendar events, one or more calendar events associated with the first calendar event category; and adjusting an appearance of each the identified calendar events associated with the first calendar event category to distinguish the identified calendar events from other calendar events presented in the user interface of the electronic calendar application.

20 Claims, 8 Drawing Sheets

SYSTEMS AND METHODS FOR VISUALIZING CATEGORIZED SETS OF CALENDAR EVENTS

TECHNICAL FIELD

The disclosed embodiments relate generally to electronic calendars. More particularly, the disclosed embodiments relate to methods, systems, graphical user interfaces, and data structures for visualizing categorized sets of calendar events.

BACKGROUND

Time management systems are ubiquitous in today's business environments. One such example are calendar applications, which allow a user to schedule appointments such as team meetings, conference calls, or other appointments. Participants can be notified of scheduled appointments by electronic communications such as email. Calendar features also include automatic event reminders, including mobile phone notifications, which instantly bring up calendar events with built-in search tools.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

An aspect of the disclosure provides a computer-implemented method comprising: presenting, in a user interface of an electronic calendar application, a plurality of calendar events and a plurality of calendar event categories, wherein each calendar event of the plurality of calendar events is associated with one or more of the plurality of categories; receiving, via the user interface of the electronic calendar application, a user selection of a first calendar event category of the plurality of calendar event categories; identifying, among the plurality of calendar events, one or more calendar events associates with the first calendar event category; and adjusting an appearance of each the identified calendar events associated with the first calendar event category to distinguish the identified calendar events from other calendar events presented in the user interface of the electronic calendar application.

A further aspect of the disclosure provides a system comprising: a memory; and a processing device, coupled to the memory, the processing device to perform a method according to any aspect or embodiment described herein.

A further aspect of the disclosure provides a non-transitory computer-readable medium comprising instructions that, responsive to execution by a processing device, cause the processing device to perform operations according to any aspect or embodiment described herein.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
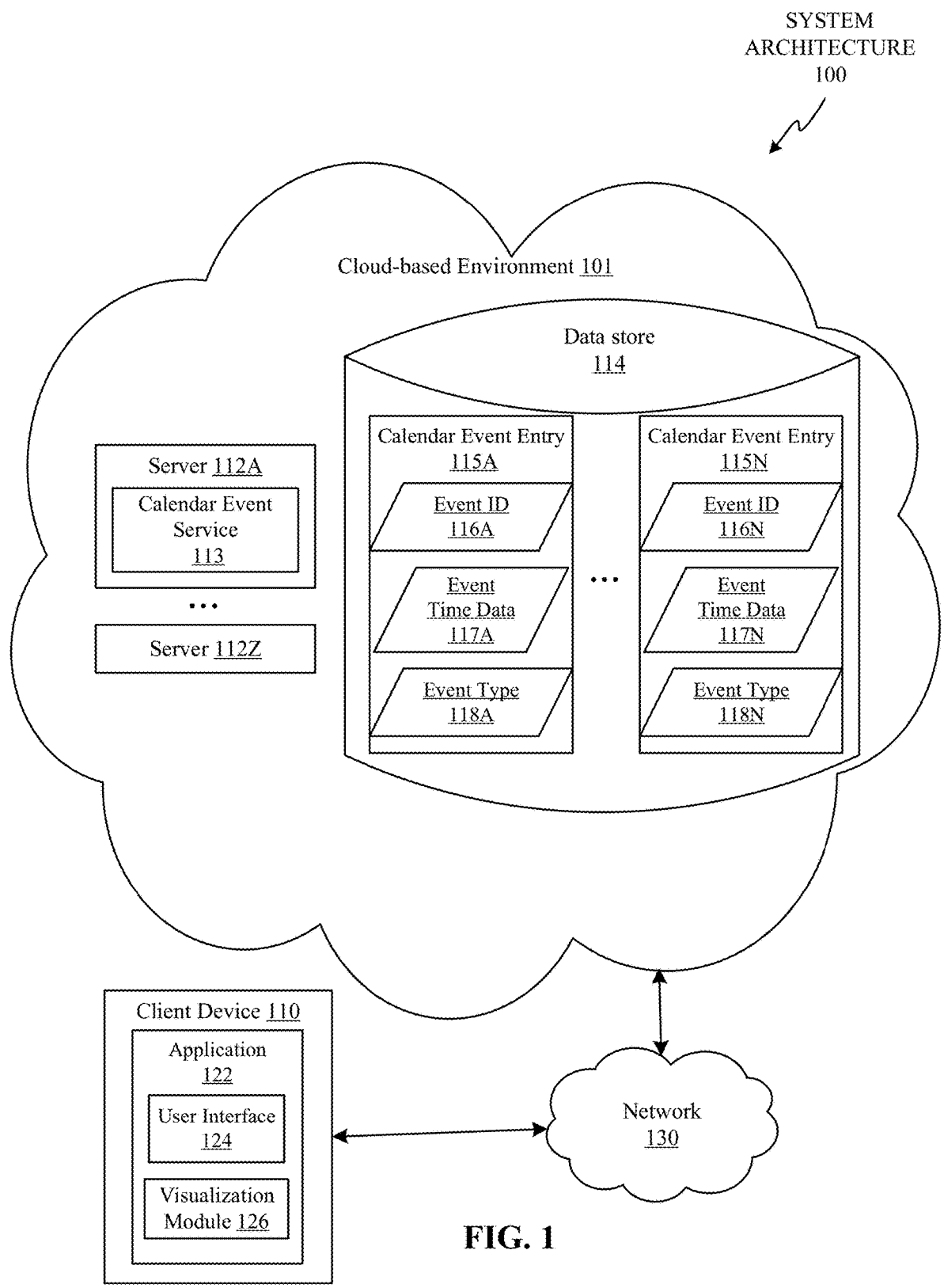
FIG. 1 illustrates an example of system architecture for enabling data visualization in calendar applications, in accordance with one implementation of the disclosure.

Calendar applications have special functionality that allows users to track scheduled events, add events to a calendar, and notify/invite other individuals of the scheduled events. Many calendar applications permit the user to denote blocks of time for appointments, conferences, personal time, scheduled vacation, holidays and other customized in-office and out-of-office events. Some calendar applications permit a sharing feature to allow other users to see upcoming events on another user's calendar.

These functions are all very useful when organizing and scheduling events and, in particular managing time. However, when visualizing multiple calendar events on, for example, a calendar month, a user can become overwhelmed by the magnitude of the calendar events, and disoriented by the type and importance of each event. For example, looking at a calendar showing dozens of scheduled calendar events for a week, a user may not be able to quickly grasp which calendar events pertain to in-office meetings, out-of-office meetings, one-on-one conference calls, multiple participant conference calls, deadlines, vacation time, etc. As such, the out-of-context data forces a user to perform selections of multiple calendar events to view their descriptions and deduce which calendar events correspond to which activity, which creates sub-optimal experience for users and results in unnecessary use of computing resources. Furthermore, current calendar applications usually do not allow users to easily understand how they spend most of their work time and to easily identify inefficiencies in their time utilization, thereby causing users to switch to different tools to obtain this information, which in turn results in running new applications and/or opening new windows and leads to further consumption of computing resources.

Aspects and implementations of the present disclosure address the above and other deficiencies by providing a mechanism for visualizing categorized calendar events in the context of a user's electronic calendar. In particular, a user can initiate a session of a calendar application. The calendar application can provide a user interface presenting an electronic calendar populated with events that the user scheduled, proposed, has been invited to by other users, etc. Each calendar event can be associated with an event ID, time related data (e.g., an event start time, an event end time, and event duration, a date of the event, etc.), and one or more event categories that each specify a particular type of event that the calendar event pertains to (e.g., in-office meetings, out-of-office meetings, user only event, one-on-one conference call, multiple participant conference call, deadline, vacation time, etc.).

The calendar application can further present, within the user interface of the calendar application, one or more areas (e.g., panels) visually representing calendar event categories. Each calendar event can be associated with one or more of the calendar event categories. Each category can be indicative of one or more event types. For example, a category can be indicative of each meeting scheduled during a particular time period (e.g., a day, a week, multiple weeks, a month, etc.). Specifically, a category can represent each scheduled and/or proposed meeting during a particular week. In another example, a category can represent every scheduled and/or proposed one-on-one meeting currently visible in the user interface.

A user can select a calendar event category in the panel by, for example, hovering a cursor over the desired category. In response, the client device can identify one or more calendar events associates with the calendar event category. For example, for each category, a data structure can store calendar event IDs of each calendar event that is associated with the category. In response to the user selection, the client device can adjust, in the user interface of the calendar application, the appearance of each of the identified calendar event associated with the category to distinguish the identified calendar events from other events presented in the user interface. For example, the client device can adjust the opaque level of the calendar events associated with the selected category, and/or the calendar events associated with the unselected category while not changing the opaque level of the other displayed calendar events or using a different opaque level for the other displayed calendar events as compared to the opaque level of the calendar events associated with the selected category. In another example, the client device can highlight the calendar events associated with the selected category without highlighting the other displayed calendar events. Once the user deselects the category (e.g., removes the cursor from the calendar event category), the client device can adjust the appearance of each calendar event to an initial state.

In some implementations, the categories may not only cover specific calendar events but also calendar time slots that currently do not have any scheduled calendar events, and/or task deadlines (e.g., previously placed on the calendar by the user) and stored in a data structure together with respective dates and task durations where specified or otherwise known. For example, the categories can also include empty time slots of a particular duration (e.g., 2-hour uninterrupted time block, 4-hour uninterrupted time block, etc.) and/or deadlines within a particular time period (e.g., deadlines within the next 2 days, deadlines within the next week, deadline within the next month, etc.). Responsive to a user selection of an uninterrupted time block category, the appearance of corresponding time slots can be adjusted (e.g., highlighted or colored) in the user interface to allow the user to see uninterrupted blocks of time of a particular duration that can be used for a task requiring such duration. Similarly, responsive to a user selection of a deadline category, the appearance of corresponding deadline events can be adjusted (e.g., highlighted or colored) in the user interface to allow the user to quickly see the deadlines occurring during a particular time period. In some implementations, in which deadlines included in the calendar are associated with respective task durations, the user may also be presented with suggested blocks of uninterrupted time that can be used to meet the specific deadlines. If no satisfactory time block can be identified for a specific deadline due to a specified task duration, a notification can be presented to the user indicating that the user needs to readjust the schedule or extend the deadline.

Aspects of the present disclosure result in improved and extended functionality of calendar applications. In particular, the aspects of the present disclosure enable users to quickly distinguish between the types of events scheduled, thus allowing users to view and compare the data without having to select multiple calendar events to view their descriptions, thereby improving user experience and resulting in more efficient use of computing resources. Furthermore, by providing above-mentioned visualizations of calendar-related information, aspects of the present disclosure allow users to easily understand how they spend most of their work time and how they can utilize their time more efficiently, without having to switch to different tools to obtain this information, thereby leading to reduced consumption of computing resources.

FIG. 1 is an example of a system architecture 100 for data visualization, in accordance with embodiments of the disclosure. The system architecture 100 includes a cloud-based environment 101 connected to client device 110 via a network 130. Although the system architecture 100 is described in the context of a cloud-based environment 101, which can enable communication between servers 112A-112Z (generally referred to as "server(s) 112" herein) in the cloud-based environment 101 and with client device 110 over the network 130 to store and share data, it can be understood that the embodiments described herein can also apply to systems that are locally interconnected. In some embodiments, the cloud-based environment 101 refers to a collection of physical machines that host applications (e.g., a browser application, an email application, a calendar application, etc.) providing one or more services (e.g., web browsing, email, calendar functions, etc.) to client device 110 (and multiple other client device which are not shown) via the network 130. By way of reference, embodiments and examples discussed throughout this disclosure may refer to a calendar service and a calendar application for illustrative purposes that separately or in collaboration provide users with an electronic version of a calendar and allows users to view, create and modify calendar events, to invite other users to participate in at least some of those calendar invite, and to be invited by other users to participate in the events of the other users. Additionally, a calendar service and/or a calendar application can provide users with other features, such as an appointment book, an address book, a contact list, a calendar collaboration capability, etc. However, it should be understood to those skilled in the art that the systems, methods, functions, and embodiments of the present disclosure can apply to any type of programs or services offered by any type of applications.

The network 130 can be a public network (e.g., the Internet), a private network (e.g., a local area network (LAN) or wide area network (WAN)), or a combination thereof. Network 130 can include a wireless infrastructure, which can be provided by one or more wireless communications systems, such as a wireless fidelity (Wi-Fi) hotspot connected with the network 130 or a wireless carrier system that can be implemented using various data processing equipment, communication towers, etc. Additionally or alternatively, network 130 can include a wired infrastructure (e.g., Ethernet).

The cloud-based environment 101 can include one or more servers 112A-112Z and a data store 114. In some embodiments, one or more of the servers 112A-112Z can host calendar event service 113 that provides a user interface 124 for presentation on the client device 110. The server 112A-112Z selected to host the calendar event service 113 can be based on certain load-balancing techniques, service level agreements, performance indicators, or the like. The user interface 124A-122Z can be presented via a web browser (not shown). Alternatively, the client device 110 includes a local (mobile or desktop) application (e.g., application 122) that provides user interface 124 and visualization module 126 and communicates with the server 112A-112Z via network 130.

In the illustrated example, application 122 is a calendar application that allows a user to create calendar events in an electronic calendar (hereafter "calendar"). The user interface 124 can display the calendar. A calendar event can be a scheduled or proposed block of time in the calendar. Each calendar event can be stored in data store 114 as a calendar event entry 115A-115N. Each calendar event entry 115A-115N can include an event identifier 116A-116N, event time data 117A-117N that specifies time related data associated with a calendar event (e.g., a start time of the calendar event, an end time of the calendar event, a duration of the calendar event, a date of the calendar event, etc.), and an event type 118A-118N that specifies the type of event that the calendar event pertains to (e.g., in-office meetings, out-of-office meetings, user only event, one-on-one conference call, multiple participate conference call, deadline, vacation time, etc.), which will be discussed in more detail below. As shown, data store 114 can be part of the cloud-based environment 101 and accessible to client devices 110 via network 130. In some implementations, calendar related data may also (or instead) be stored in a data store that is local to the client device 110. For example, as a user schedules meetings or enters other calendar events, this information can be stored in a local data store on the client device 110, and then synchronized with the data store 114 in the cloud-based environment 101. Alternatively, calendar related data pertaining to the user can be cached locally on the client device 110 (e.g., periodically or based on predefined triggers).

In some embodiments, a user of client device 110 can use the application 122 to add, edit, view, and/or propose changes to a calendar event in the user interface 124. Specifically, a user can generate a calendar event via user interface 124 of the application 122. For example, the user can select a day (or a time slot within the day) displayed on the calendar, input details regarding the event, and select a button to generate the event. The details can include a start time of the event, an end time of the event, a location of the event, whether there are other participants, video conference information, a message, etc. Once the calendar event is generated, application 122 can generate a calendar event entry 115A-115N for the calendar event by, for example, assigning an event identifier 116A-116N to the calendar event, logging the date, start time, and end time of the calendar event (as event time data 117A-117N), and logging what type of event it is (as event type 118A-118N). In some embodiments, the duration of the calendar event can be determined (either by calendar event service 113 or application 122) based on the event start time and the event end time, and stored in the event time data 117A-117N.

In some embodiments, for each calendar event, a user can associate an event type to each respective calendar event. For example, the user can select a dropdown menu and select one or more event types from a predetermined list. In another example, the user can enter the event type into a text field.

In some embodiments, the calendar event service 113 or application 122 can automatically generate event type data 118 for each calendar event. For example, the calendar event service 113 or calendar application 122 can detect whether a calendar event is a user only event, a one-on-one event, or a multiple participant event based on whether (and how many) other participants are invited and/or have accepted an invite to the calendar event. In another example, the calendar event service 113 or calendar application 122 can determine whether the calendar event is an in-office meeting, an out-of-office-meeting, a conference call, and so forth, based on location information provided by the user when generating the calendar event (e.g., whether the location of the calendar event is set as the office or outside the office, whether a link or button to a conference call application is provided, etc.).

Visualization module 126 can present, in the user interface 124, the calendar events (in the electronic calendar) and one or more sets of calendar event categories (in a panel(s) of the user interface 124). Each calendar event can be associated with one or more of the calendar event categories (hereafter "categories"). Each category can be indicative of one or more event types. In one example, a category can be indicative of each meeting scheduled during a particular time period (e.g., a day, a week, multiple weeks, a month, etc.). Specifically, a category can include each scheduled and/or proposed during the week of June 18$^{th}$. In another example, a category can be indicative of every scheduled and/or proposed one-on-one meeting displayed within the user interface 124. In yet another example, a category can be indicative of a specific user participating in a scheduled event(s).

In some implementations, the visualization module 126 can obtain, from data store 114, calendar data for each calendar event displayed by the user interface 124. The calendar data for each calendar event can include one or more categories and time related data (e.g., a duration, a start time, a date(s), user data such as other users participating in a calendar event, etc.). Visualization module 126 can then store, in a local cache on the client device 110, the event IDs 116A-116N of the calendar event entries 115A-115N. In some implementations, a local cache for each category can be maintained, and an event ID associated with a specific category can be stored in the corresponding cache. If an event is associated with multiple categories, its event ID may be stored in multiple caches. In some implementations, a single local cache is maintained for all calendar events, and each event ID is stored with one or more relevant categories in the single cache.

In some embodiments, the user interface 124 comprises a first area and a second area. The first area of the user interface 124 can present each of the plurality of calendar events in a time slot representing a corresponding date and time. A calendar event can be presented in the time slot with the name of the event and/or other data that is not indicative of any calendar event category (e.g., the name of a user that created the event). A user can view additional information about the calendar event by selecting the calendar event (e.g., by clicking on the calendar event in the time slot), which causes a sub-window with the additional information about the calendar event to be opened. If the user performs such a selection, the opened sub-window would cover at least a portion of the first area, hiding many of the calendar events previously presented to the user. Aspects of the present disclosure address this sub-optimal user viewing experience by including one or more panels in the second area of the user interface 124, where each panel displays one or more categories. For example, the user interface 124 can present a first panel associated with first set categories and a second panel associated with a second set of categories. In some embodiments, the panel(s) can further display a total time of the scheduled and/or proposed calendar events correlating to each category. For example, in a specified week (displayed on the user interface 124) for a particular category (e.g., one-on-one meetings), visualization module 126 can determine the duration of each one-on-one meetings during said week by retrieving event time data 117A-117N from the cache, summing the corresponding durations, and presenting the total time of the scheduled and/or proposed calendar events next to the corresponding category. As such, the user is able to see meaningful information about calendar events and empty time slots on the same screen without having to open additional sub-windows for individual calendar events and switching between those sub-windows and the original window presenting the calendar events and the empty time slots.

In some embodiments, one or more panels can be predetermined or preset. For example, the panel(s) can be a feature of the calendar application. In some embodiments, one or more panels can be customized by the user. For example, a user can create a custom panel that includes one or more categories selected or created by the user.

In some embodiments, using the user interface 124, a user can select a category from a panel by, for example, hovering a cursor over the category in the user interface 124, clicking on the category, or selecting a button associated with the category. The visualization module 126 can detect the user selection of the category, and identify one or more calendar events associated with the category. For example, the visualization module 126 can retrieve the event ID 116A-116N of each calendar event associated with the category. Once identified, the visualization module 126 can adjust the appearance of each of the identified calendar events associated with the category in the user interface 124.

In some embodiments, the visualization module 126 can adjust the appearance by adjusting the color, intensity, and or formatting, in the calendar, of each calendar event associated with the category. For example, the visualization module can highlight each calendar event associated with the category. In some embodiments, the visualization module 126 can adjust the appearance by adjusting an opaque value of each calendar event, in the calendar, not associated with the category. For example, the visualization module 126 can adjust the opaque value of calendar event not associated with the calendar to make said event more transparent, thus, by comparison, emphasizing the calendar events associated with the category. In other embodiments, the visualization module 126 can adjust the appearance by adjusting an opaque value of each calendar event, in the calendar, associated with the category. For example, each calendar event can have an opaque value of approximately 50%. In response to a user selecting a category, the opaque value of each calendar event in the selected category can be adjusted to a value above 50%, and/or the opaque value of each calendar event in the unselected category(ies) can be adjusted to a value below 50%. Visualization module 126 can use any combination of the discussed types of adjustments, or other types of adjustments. Once the user deselects the category, the visualization module 126 can restore the appearance of each calendar event associated with the category to a pre-adjusted state (e.g., an initial or original state).

The servers 112A-112Z can be physical machines (e.g., server machines, desktop computers, etc.) that each include one or more processing devices communicatively coupled to memory devices and input/output (I/O) devices. The processing devices can include a computer, microprocessor, logic device or other device or processor that is configured with hardware, firmware, and software to carry out some of the embodiments described herein. Each of the servers 112A-112Z can host application 122, which can include a calendar event module 113. The calendar event module 113 can be implemented as computer instructions that are executable by one or more processing devices on each of the servers 112A-112Z. The calendar event module 113 can perform the operations described with respect to the following Figures.

In some embodiments, the user interface 124 can be a web page rendered by a web browser and displayed on the client device 110 in a web browser window. In another embodiment, the user interface 124 can be included in a stand-alone application downloaded to the client device 110 and natively running on the client devices 110 (also referred to as a "native application" or "native client application" herein).

The client device 110 can include one or more processing devices communicatively coupled to memory devices and I/O devices. The client device 110 can be desktop computers, laptop computers, tablet computers, mobile phones (e.g., smartphones), or any suitable computing device. The client device 110 can include components, such as an input device and an output device. A user can be authenticated by the server 112A-112Z using a username and password (or other identification information) provided by a user via the user interface 124, such that the same client device 110 can be used by different users at different times.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
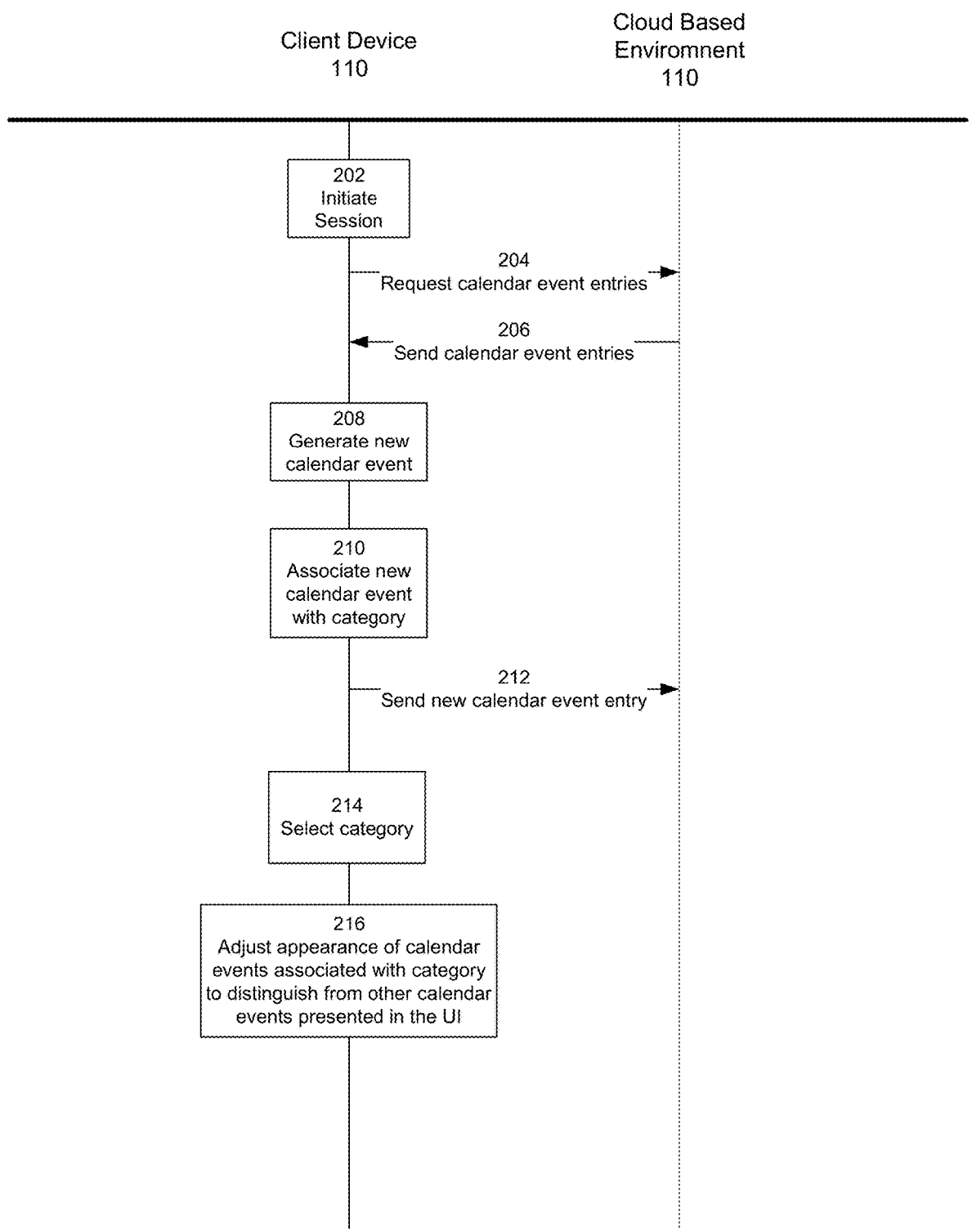
FIG. 2 depicts an interaction diagram of operations for visualizing calendar events based on a category, in accordance with embodiments of the disclosure.

FIG. 2 is a diagram of operations for visualizing calendar events based on a category, in accordance with embodiments of the disclosure. System 200 can include similar components as system architecture 100 of FIG. 1. It may be noted that components of FIG. 1 can be used to help describe FIG. 2. For purposes of illustration, rather than limitation, operations with respect to system 200 are described as performed by client device 110 or cloud-based environment 101 may be performed by any component thereof, unless otherwise described. The operations described with respect to FIG. 2 are shown to be performed sequentially for the sake of illustration, rather than limitation. It may be noted that the operations may be performed in any order and that any of the operations may be performed concurrently with one or more other operations. In some implementations, the same, different, fewer, or greater number of operations may be performed in any order.

At operation 202, client device 110 initiates a session of a calendar application. A session of the application can correspond to the user loading, launching, or opening the calendar application on the client device.

At operation 204, client device 110 requests, from the cloud-based environment 101, calendar event entries 115A-115N corresponding to the user's calendar. Each calendar event entry can include an event ID, event time data, and an event type of each calendar event.

At operation 206, cloud-based environment 101 sends the calendar event entries 115A-115N to client device 110. Client device 110 can then provide, for presentation on its screen, a user interface displaying an electronic calendar, one or more calendar events associated with the user, and one or more panels displaying calendar event categories. Client device 110 can also cache the calendar entries in a data structure maintained by the client device 110.

At operation 208, client device 110 receives user input to generate a new calendar event. For example, the user can select a day (or a time slot within the day) displayed on the calendar, input details regarding the event (e.g., a start time, an end time, an event type, etc.), and select a button to generate the event. Client device 110 can then generate the calendar event. For example, the client device 110 can present the calendar event in the time slot selected by the user. Client device 110 can further cache the calendar event entry (the event ID, the event time data, and the event type) in the data structure maintained by the client device 110.

At operation 210, client device 110 can associate the calendar event with one or more categories presented in one or more of the panels. In particular, client device 110 can determine whether the event type of the calendar event matches to the parameters set forth by any of the categories. For each determined match, client device 110 can associate the event ID of the calendar event to the category. For example, the event ID can be stored in a data structure associated with the category.

At operation 212, client device 110 sends the new calendar event entry to the cloud-based environment 101. The calendar event entry can include, for example, an event ID, event time data, and an event type.

At operation 214, client device 110 receives user input selecting a category from the panel. For example, the user interface of client device 110 can detect that a cursor is hovering over the category.

At operation 216, client device 110 adjusts an appearance, in the user interface, of each the identified calendar events associated with the category to distinguish the identified calendar events from other calendar events presented in the user interface. For example, the client device 110 can adjust the opaque level of the calendar events in the selected category, and/or the calendar events in the unselected category. In another example, the client device 110 can highlight the calendar events in the selected category. Once the user deselects the category, the client device 110 can restore the appearance of each calendar event associated with the category to a pre-adjusted state (e.g., an original or initial state).

Figure 3:
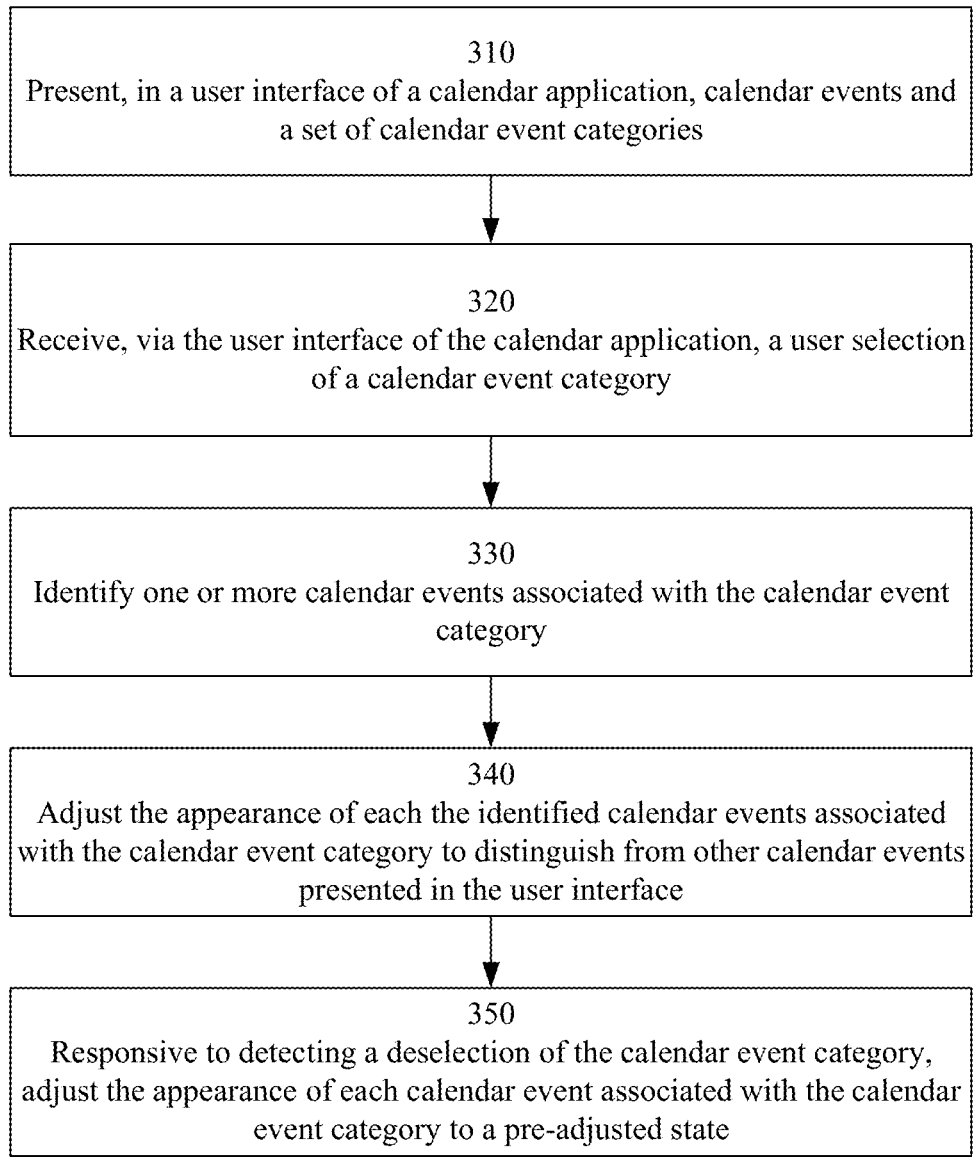
FIG. 3 depicts a flow diagram of a method for visualizing calendar events based on a category, in accordance with one implementation of the present disclosure.

FIG. 3 depicts a flow diagram of a method 300 showing a process for visualizing calendar events based on a category, in accordance with some aspects of the disclosure. The method 300 is performed by processing logic that can comprise hardware (circuitry, dedicated logic, etc.), software (such as is run on a general purpose computer system or a dedicated machine), or a combination of both. In one implementation, the method is performed by the client device 110 and/or the cloud-based environment 101 of FIG. 1, while in some other implementations one or more blocks of FIG. 3 can be performed by another machine. In one implementation, a processing device of a client device (e.g., client device 110 in FIG. 1) performs method 300.

At block 310, the processing device presents, in a user interface of a calendar application, calendar events and a set of calendar event categories. Each calendar event can be associated with at least one category.

At block 320, the processing device receives, via the user interface of the calendar application, a user selection of a calendar event category. For example, the user can hover a cursor over the category in a panel within the user interface.

At block 330, the processing device identifies, among the calendar events, one or more calendar events associated with the calendar event category. In some embodiments, the processing device can determine whether the event type of the calendar event matches to the parameters (such as an event type, time related data, user data, etc.) set forth by any of the categories.

At block 340, the processing device adjusts the appearance, in the user interface of the calendar application, of each the identified calendar events associated with the calendar event category to distinguish the identified calendar events from other calendar events presented in the user interface. For example, the processing device can adjust the opaque level of the calendar events in the selected calendar event category, and/or the calendar events in the unselected calendar event categories. In another example, the processing device can highlight the calendar events in the selected calendar event category.

At block 350, responsive to detecting a deselection of the calendar event category, the processing device adjusts the appearance of each calendar event associated with the calendar event category to the initial state.

Figure 4A:
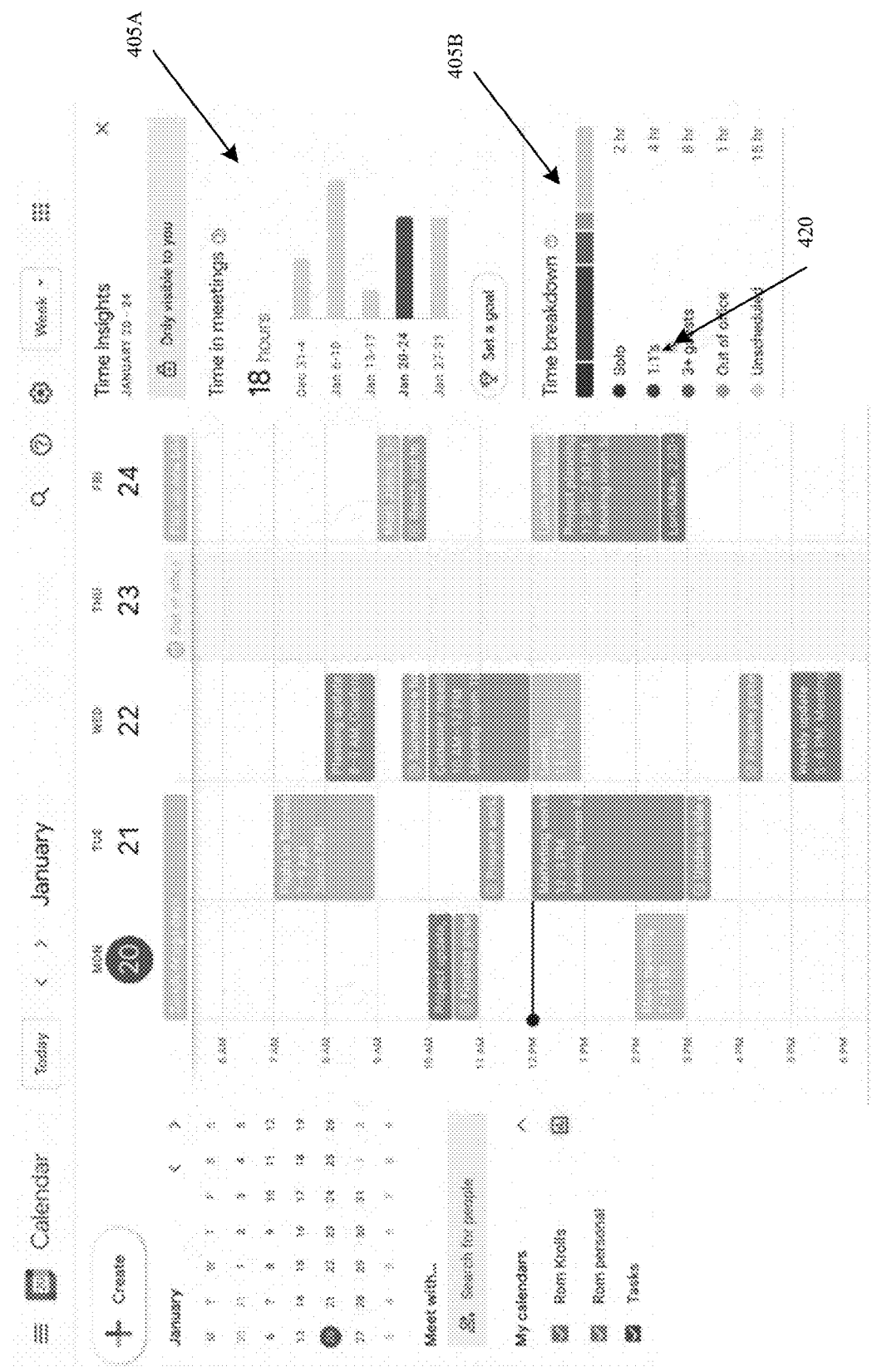
FIGS. 4A-4C illustrate example graphical user interfaces (GUI) on a client device illustrating adjusting the appearance of calendar events based on the selection of a calendar event category, in accordance with an implementation of the disclosure.
Figure 4B:
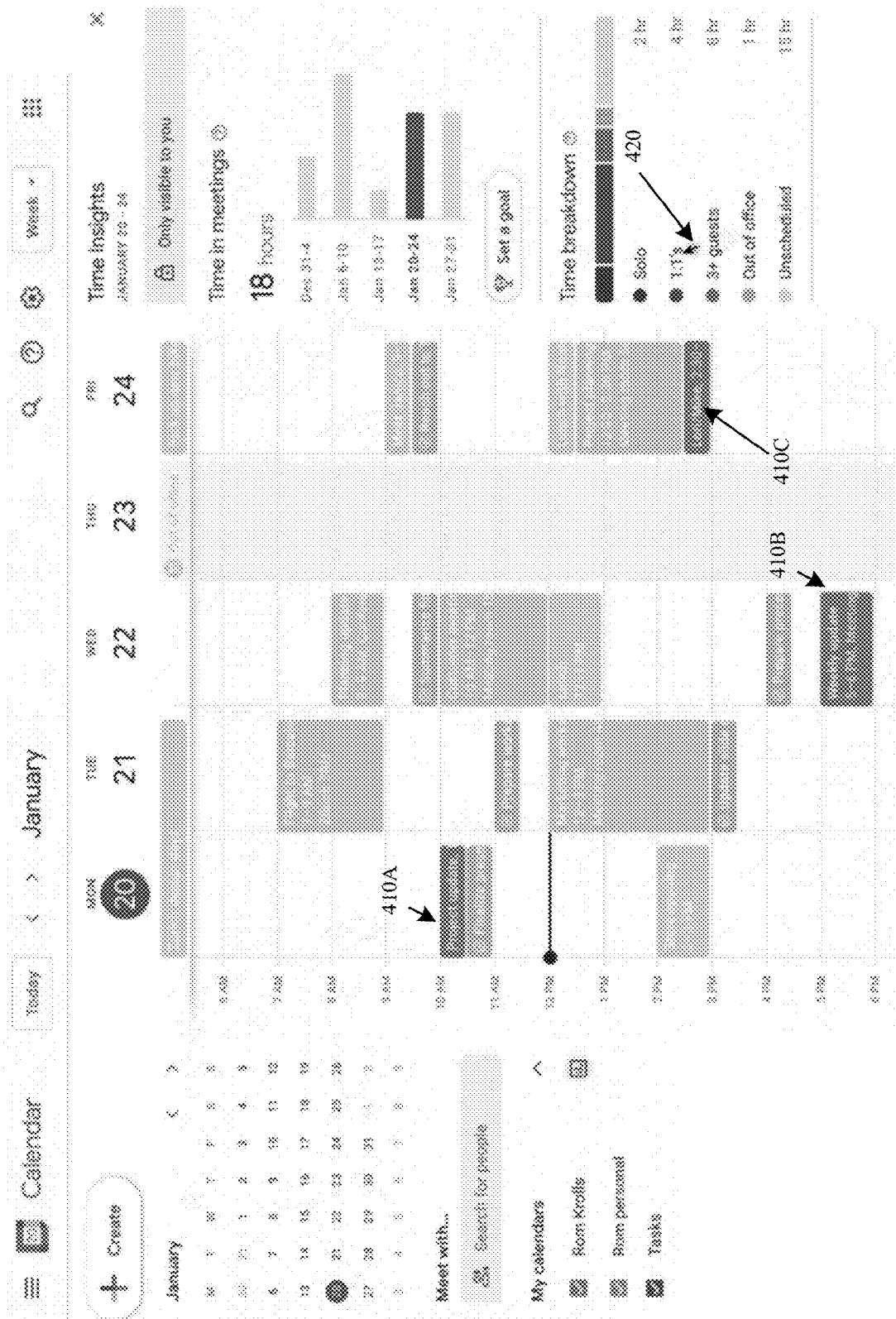
Figure 4C:
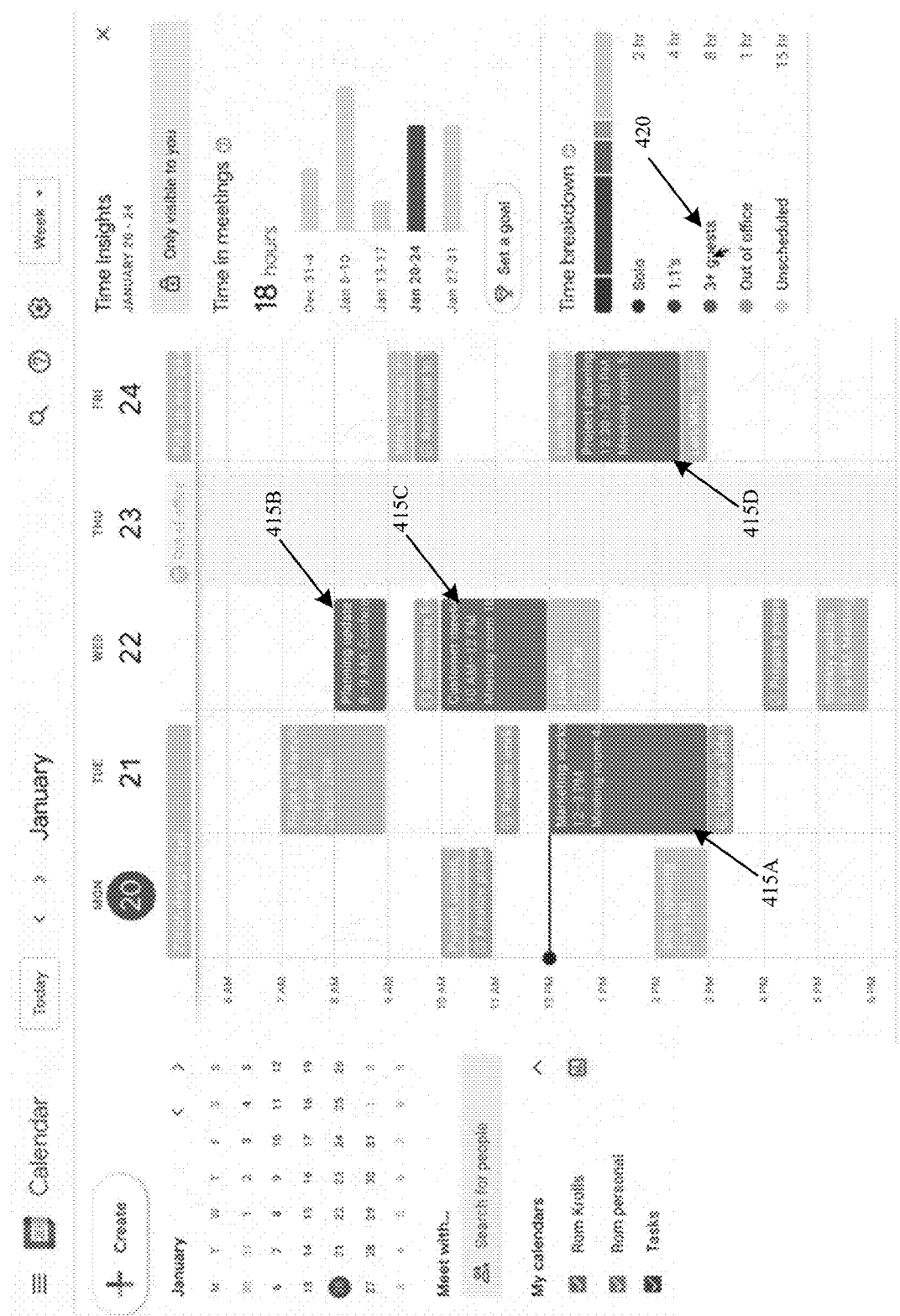

FIGS. 4A-4C are illustrations of example graphical user interfaces (GUI) on a client device illustrating adjusting the appearance of calendar events based on the selection of a calendar event category, in accordance with some aspects of the disclosure. Specifically, FIG. 4A shows an example user interface of a calendar application. The user interface include a calendar presenting multiple calendar events for the week of January $20^{th}$-$24^{th}$. The user interface further includes two category panels (panel 405A and panel 405B). Panel 405A includes a set of five "time in meetings" categories, where each category is indicative of meeting type calendar events during different weeks. Panel 405B includes a set "time breakdown" categories, where each category is indicative of different types of calendar events during the current week. In particular, panel 405B includes a category indicative of solo (user only) work related events, one-on-one meetings, three or more participant meetings, out-of-office events, and unscheduled blocks of time. None of the categories are selected in FIG. 4A (the cursor 420 is not hovering over a category). Thus, each calendar event is presented in the initial state.

FIG. 4B shows an example user interface with cursor 420 selecting (hovering over) a one-on-one meeting category. In response, the user interface adjusts the appearance (e.g., highlights) of the one-on-one meeting type calendar events (meetings 410A-410C) during the current week displayed by the calendar. The user interface further adjusts the appearance of the calendar events of the unselected categories by decreasing their opaque value, thus increasing their visual transparency.

FIG. 4C shows an example user interface with cursor 420 selecting (hovering over) a three or more participant meeting category. In response, the user interface adjusts the appearance (e.g., highlights) of the three or more participant meeting type calendar events (meetings 415A-415D) during the current week displayed by the calendar. The user interface further adjusts the appearance of the calendar events of the unselected categories by decreasing their opaque value, thus increasing their visual transparency. As shown, this enables the client device to generate a visual contrast to allow the user to easily distinguish between different categories of calendar events.

Figure 5:
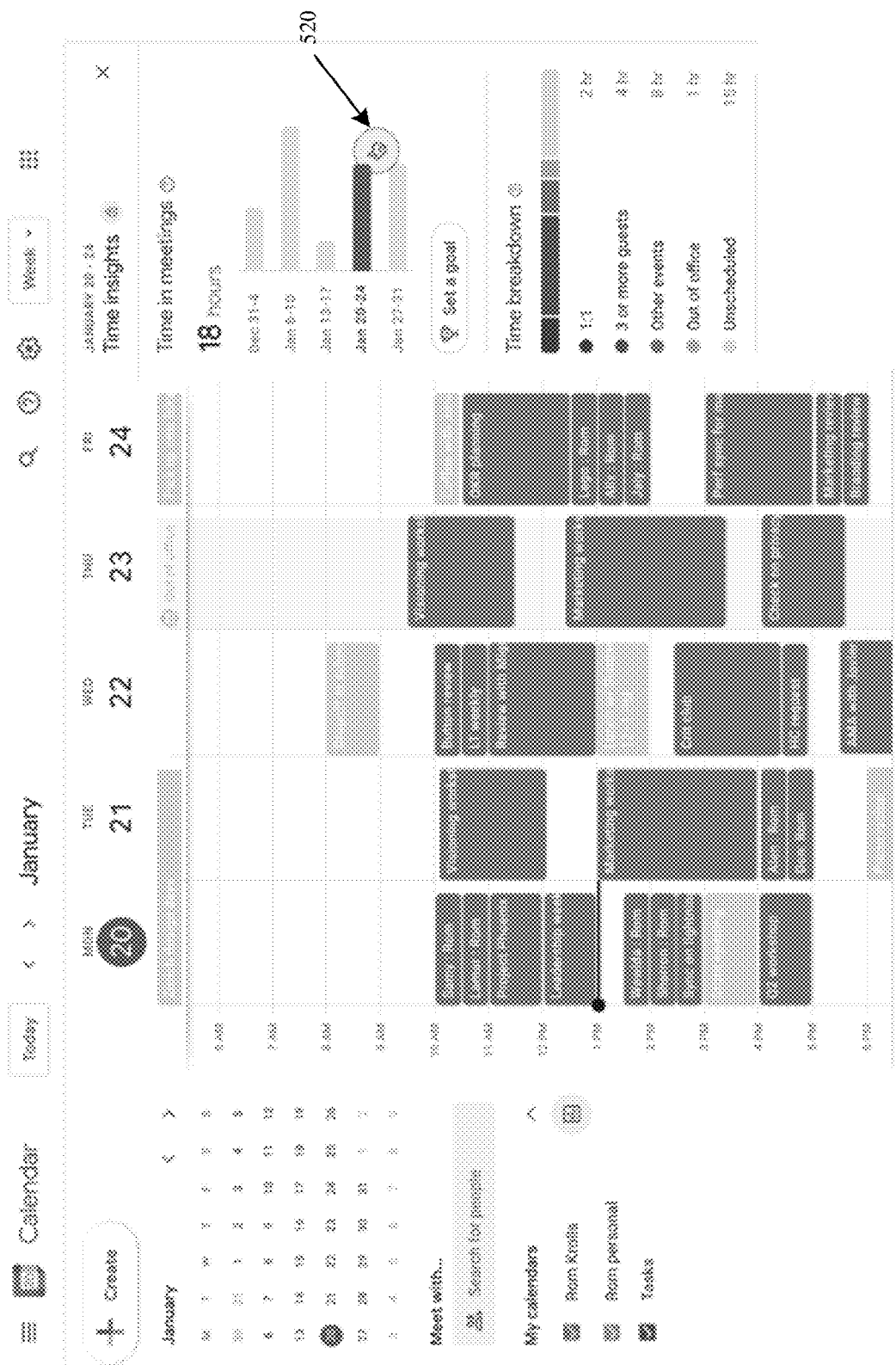
FIG. 5 illustrate another example GUI on a client device illustrating adjusting the appearance of calendar events based on the selection of a calendar event category, in accordance with one implementation of the present disclosure.

FIG. 5 shows another example GUI on a client device illustrating adjusting the appearance of calendar events based on the selection of a calendar event category. The user interface include a set of calendar events for the week of January $20^{th}$-$24^{th}$. As shown, the cursor 450 selects (hovers over) the meeting type calendar events during the week of January 20-$24^{th}$. In response, the user interface adjusts the appearance (e.g., highlights) of all meeting type calendar events (darker shaded calendar events) displayed within the calendar. The user interface further adjusts the appearance of all non-meeting type calendar events (lighter shaded calendar events) displayed within the calendar by decreasing their opaque value, thus increasing their visual transparency.

Figure 6:
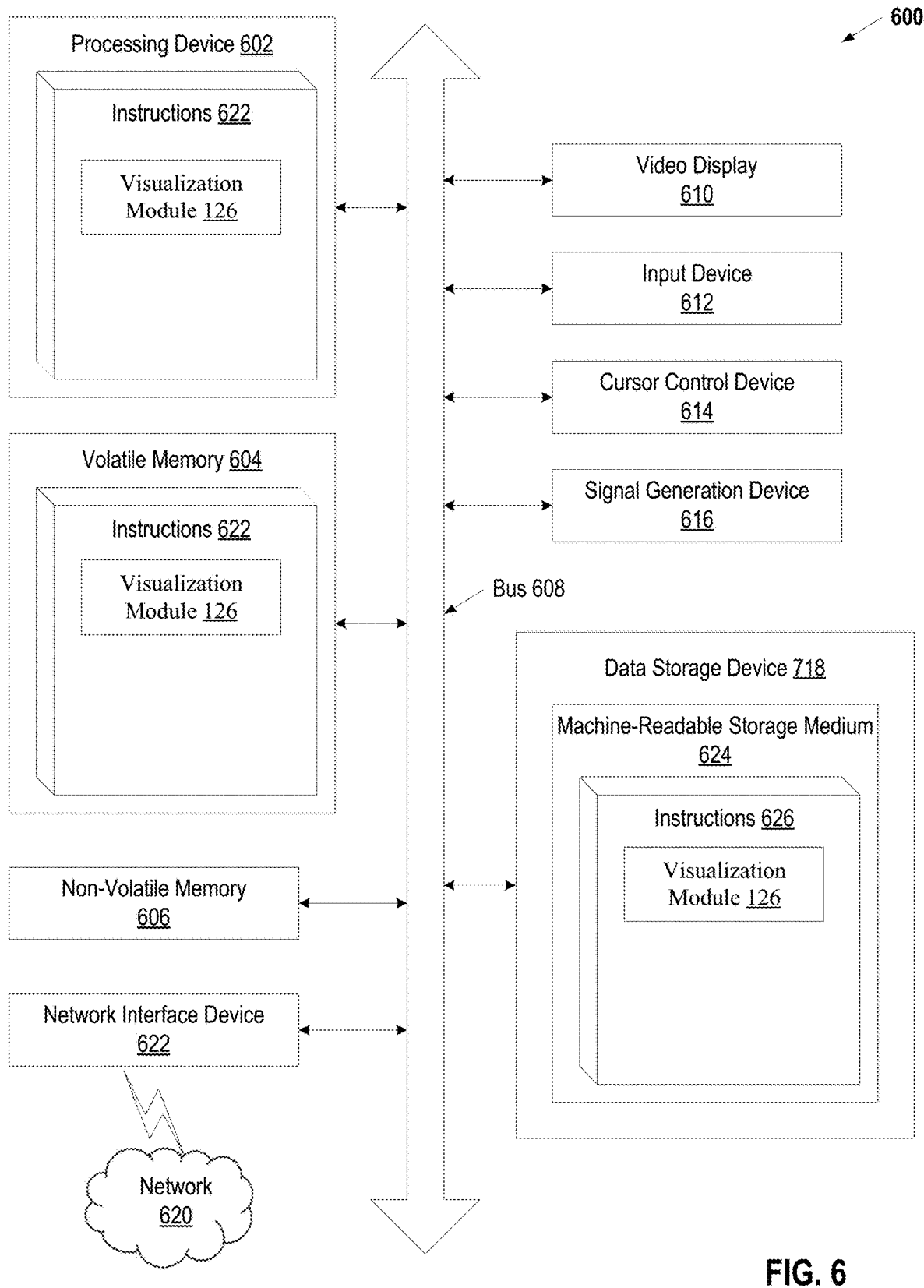
FIG. 6 depicts a block diagram of an example computing device operating in accordance with one or more aspects of the present disclosure.

FIG. 6 depicts a block diagram of a computer system operating in accordance with one or more aspects of the present disclosure. In certain implementations, computer system 600 can be connected (e.g., via a network, such as a Local Area Network (LAN), an intranet, an extranet, or the Internet) to other computer systems. Computer system 600 can operate in the capacity of a client device. Computer system 600 can operate in the capacity of a server or a client computer in a client-server environment. Computer system 600 can be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 can include a processing device 602, a volatile memory 604 (e.g., random access memory (RAM)), a non-volatile memory 606 (e.g., read-only memory (ROM) or electrically-erasable programmable ROM (EEPROM)), and a data storage device 618, which can communicate with each other via a bus 608.

Processing device 602 can be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 can further include a network interface device 622. Computer system 600 also can include a video display unit 66 (e.g., an LCD), an input device 612 (e.g., a keyboard, an alphanumeric keyboard, a motion sensing input device, touch screen), a cursor control device 614 (e.g., a mouse), and a signal generation device 616.

Data storage device 618 can include a non-transitory machine-readable storage medium 624 on which can store instructions 626 encoding any one or more of the methods or functions described herein, including instructions encoding components of client device of FIG. 1 for implementing method 300.

Instructions 626 can also reside, completely or partially, within volatile memory 704 and/or within processing device 602 during execution thereof by computer system 600, hence, volatile memory 604 and processing device 602 can also constitute machine-readable storage media.

While machine-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein can be implemented by discrete hardware components or can be integrated in the functionality of other hardware components such as ASICS, FPGAs, DSPs or similar devices. In addition, the methods, components, and features can be implemented by firmware modules or functional circuitry within hardware devices. Further, the methods, components, and features can be implemented in any combination of hardware devices and computer program components, or in computer programs.

Unless specifically stated otherwise, terms such as "receiving," "determining," "sending," "displaying," "identifying," "selecting," "excluding," "creating," "adding," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and can not have an ordinal meaning according to their numerical designation.

Examples described herein also relate to an apparatus for performing the methods described herein. This apparatus can be specially constructed for performing the methods described herein, or it can comprise a general purpose computer system selectively programmed by a computer program stored in the computer system. Such a computer program can be stored in a computer-readable tangible storage medium.

The methods and illustrative examples described herein are not inherently related to any particular computer or other apparatus. Various general purpose systems can be used in accordance with the teachings described herein, or it can prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled

What is claimed is:

1. A computer-implemented method comprising:
presenting, in a user interface of an electronic calendar application, a plurality of calendar events and a plurality of calendar event categories, wherein each calendar event of the plurality of calendar events is associated with one or more of the plurality of categories;
receiving, via the user interface of the electronic calendar application, a user selection of a first calendar event category of the plurality of calendar event categories, wherein the first calendar event category is associated with a calendar event type indicator;
determining, using the calendar event type indicator, a calendar event ID of each calendar event associated with the first calendar event category;
identifying, based on respective one or more calendar event IDs and among the plurality of calendar events, one or more calendar events associated with the first calendar event category; and
adjusting an appearance of each the identified calendar events associated with the first calendar event category to distinguish the identified calendar events from other calendar events presented in the user interface of the electronic calendar application.

2. The computer-implemented method of claim 1, wherein detecting the selection comprises detecting a cursor hovering over the first calendar event category in a panel on the user interface.

3. The computer-implemented method of claim 1, further comprising:
responsive to detecting the selection of the first calendar event category, adjusting an opaque value of each calendar event associated with a second calendar event category in the electronic calendar.

4. The computer-implemented method of claim 1, wherein adjusting the appearance of each calendar event associated with the first calendar event category comprises highlighting, in the electronic calendar, each calendar event associated with the first calendar event category.

5. The computer-implemented method of claim 1, further comprising:
responsive to detecting a deselection of the first calendar event category, adjusting the appearance of each calendar event associated with the first calendar event category to an initial state.

6. The computer-implemented method of claim 1, wherein:
the user interface of the electronic calendar application comprises a first area that presents each of the plurality of calendar events in a time slot representing a corresponding date and time, and a second area that presents the plurality of calendar event categories,
a calendar event of the plurality of calendar events is presented with data that is not indicative of any calendar event category; and
a user selection of the calendar event in the first area causes a sub-window with additional information about the calendar event to be opened, the sub-window covering at least a portion of the first area, the additional information indicating one or more calendar event categories of the calendar event.

7. The computer-implemented method of claim 1, wherein determining, using the calendar event type indicator, the calendar event indicator of each calendar event associated with the first calendar event category comprises:
responsive to receiving the user selection of the first calendar event category, obtaining, from a data structure stored on a client device, the calendar event indicator of each calendar event associated with the first calendar event category.

8. A system comprising:
a memory; and
a processing device, coupled to the memory, to:
present, in a user interface of an electronic calendar application, a plurality of calendar events and a plurality of calendar event categories, wherein each calendar event of the plurality of calendar events is associated with one or more of the plurality of categories;
receive, via the user interface of the electronic calendar application, a user selection of a first calendar event category of the plurality of calendar event categories wherein the first calendar event category is associated with a calendar event type indicator;
determine, using the calendar event type indicator, a calendar event ID of each calendar event associated with the first calendar event category;
identify, based on respective one or more calendar event IDs and among the plurality of calendar events, one or more calendar events associated with the first calendar event category; and
adjust an appearance of each the identified calendar events associated with the first calendar event category to distinguish the identified calendar events from other calendar events presented in the user interface of the electronic calendar application.

9. The system of claim 8, wherein detecting the selection comprises detecting a cursor hovering over the first calendar event category in a panel on the user interface.

10. The system of claim 8, wherein the processing device is further operative to:
responsive to detecting the selection of the first calendar event category, adjusting an opaque value of each calendar event associated with a second calendar event category in the electronic calendar.

11. The system of claim 8, wherein adjusting the appearance of each calendar event associated with the first calendar event category comprises highlighting, in the electronic calendar, each calendar event associated with the first calendar event category.

12. The system of claim 8, wherein the processing device is further operative to:
responsive to detecting a deselection of the first calendar event category, adjusting the appearance of each calendar event associated with the first calendar event category to an initial state.

13. The system of claim 8, wherein:
the user interface of the electronic calendar application comprises a first area that presents each of the plurality of calendar events in a time slot representing a corresponding date and time, and a second area that presents the plurality of calendar event categories, a calendar event of the plurality of calendar events is presented with data that is not indicative of any calendar event category; and a user selection of the calendar event in the first area causes a sub-window with additional information about the calendar event to be opened, the sub-window covering at least a portion of the first area, the additional information indicating one or more calendar event categories of the calendar event.

14. The system of claim 8, wherein to determine the calendar event type indicator of each calendar event associated with the first calendar event category, the processing device is further operative to:

responsive to receiving the user selection of the first calendar event category, retrieve the one or more calendar event type indicators from a data structure stored on a client device, wherein the data structure is associated with the first calendar event category.

15. A non-transitory computer-readable medium comprising instructions that, responsive to execution by a processing device, cause the processing device to perform operations comprising:

presenting, in a user interface of an electronic calendar application, a plurality of calendar events and a plurality of calendar event categories, wherein each calendar event of the plurality of calendar events is associated with one or more of the plurality of categories;

receiving, via the user interface of the electronic calendar application, a user selection of a first calendar event category of the plurality of calendar event categories wherein the first calendar event category is associated with a calendar event type indicator;

determining, using the calendar event type indicator, a calendar event ID of each calendar event associated with the first calendar event category;

identifying, based on respective one or more calendar event IDs and among the plurality of calendar events, one or more calendar events associated with the first calendar event category; and adjusting an appearance of each the identified calendar events associated with the first calendar event category to distinguish the identified calendar events from other calendar events presented in the user interface of the electronic calendar application.

16. The non-transitory computer-readable medium of claim 15, wherein detecting the selection comprises detecting a cursor hovering over the first calendar event category in a panel on the user interface.

17. The non-transitory computer-readable medium of claim 15, wherein the instructions cause the processing device to further perform operations comprising:

responsive to detecting the selection of the first calendar event category, adjusting an opaque value of each calendar event associated with a second calendar event category in the electronic calendar.

18. The non-transitory computer-readable medium of claim 15, wherein adjusting the appearance of each calendar event associated with the first calendar event category comprises highlighting, in the electronic calendar, each calendar event associated with the first calendar event category.

19. The non-transitory computer-readable medium of claim 15, wherein the instructions cause the processing device to further perform operations comprising:

responsive to detecting a deselection of the first calendar event category, adjusting the appearance of each calendar event associated with the first calendar event category to an initial state.

20. The non-transitory computer-readable medium of claim 15, wherein determining the calendar event type indicator of each calendar event associated with the first calendar event category comprises:

responsive to receiving the user selection of the first calendar event category, obtaining, from a data structure stored on a client device, the calendar event type indicator of each calendar event associated with the first calendar event category.

* * * * *